(12) United States Patent
Beaudoin

(10) Patent No.: US 6,242,542 B1
(45) Date of Patent: Jun. 5, 2001

(54) SYNDIOTACTIC VINYLAROMATIC POLYMERIZATION USING MULTIPLE REACTORS IN SERIES

(75) Inventor: Daniel A. Beaudoin, Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/424,325

(22) PCT Filed: Aug. 13, 1998

(86) PCT No.: PCT/US98/16789

§ 371 Date: Nov. 19, 1999

§ 102(e) Date: Nov. 19, 1999

(87) PCT Pub. No.: WO99/10394

PCT Pub. Date: Mar. 4, 1999

Related U.S. Application Data

(60) Provisional application No. 60/057,226, filed on Aug. 27, 1997.

(51) Int. Cl.[7] .................................................. C08F 12/04
(52) U.S. Cl. .................................. 526/87; 526/65; 526/88; 526/346
(58) Field of Search ................................. 526/88, 65, 346, 526/87

(56) References Cited

U.S. PATENT DOCUMENTS

| | | | |
|---|---|---|---|
| 5,254,647 | * 10/1993 | Yamamoto et al. | .................... 526/65 |
| 5,306,790 | * 4/1994 | Imabayashi et al. | ............ 526/902 X |
| 5,597,879 | * 1/1997 | Ase et al. | ............................... 526/65 |

* cited by examiner

Primary Examiner—Fred Teskin

(57) ABSTRACT

A method for making a syndiotactic vinylaromatic polymer. The method includes mixing a first amount of a vinylaromatic monomer with a catalyst in a first back-mixed reaction zone under polymerization conditions such that the vinylaromatic monomer polymerizes to a conversion of from 60 to 85 percent to form a polymer-containing mixture. The polymer-containing mixture is passed to at least one other back-mixed reaction zone where it contacts a second amount of the vinylaromatic monomer under polymerization conditions such that the syndiotactic vinylaromatic polymer is formed.

20 Claims, 1 Drawing Sheet

SYNDIOTACTIC VINYLAROMATIC POLYMERIZATION USING MULTIPLE REACTORS IN SERIES

CROSS REFERENCE STATEMENT

This application claims benefit of U.S. Provisional Application Ser. No. 60/057,226, filed Aug. 27, 1997.

The present invention relates to a process for producing syndiotactic vinylaromatic polymers.

Syndiotactic vinylaromatic polymers are typically prepared in the form of particulate polydispersed material, that is, powders. Such polymers can be made using various methods. For example, U.S. Pat. No. 5,037,907 describes a vertical tank reactor equipped with a stirring agitator for making particulate syndiotactic polystyrene. Another technique is described in U.S. Pat. No. 5,254,647, which is a process for preparing syndiotactic vinylaromatic polymers in a wiped surface reactor. In yet another example, in U.S. Pat. No. 5,484,862, a process for preparing syndiotactic vinylaromatic polymers in a horizontally disposed, continuously agitated cylindrically shaped reactor is described.

The catalysts used to make syndiotactic vinylaromatic polymers typically include a Group 4 metal complex and an activator, which are relatively expensive. However, the above mentioned prior art does not use catalysts as efficiently as is desired. It would be an advance in the art of syndiotactic vinylaromatic polymerization to provide a process which utilizes the catalyst more efficiently than in the above-mentioned prior art.

In one aspect, the present invention is a method for making a syndiotactic vinylaromatic polymer comprising mixing a first amount of a vinylaromatic monomer with a catalyst under well stirred, back-mixed polymerization conditions such that the first amount of vinylaromatic monomer polymerizes to a conversion of from 60 to 85 percent to form a polymer-containing mixture; and contacting the polymer-containing mixture with a second amount of the same or a different vinylaromatic monomer under well stirred, back-mixed polymerization conditions such that the syndiotactic vinylaromatic polymer is formed.

In a second aspect, the present invention is a method for making a syndiotactic vinylaromatic polymer comprising mixing a first amount of a vinylaromatic monomer with a catalyst in a first reaction zone under well stirred, back-mixed polymerization conditions such that the first amount of the vinylaromatic monomer polymerizes to a conversion of from 60 percent to 85 percent to form a polymer-containing mixture; passing at least a portion of the polymer-containing mixture to one of at least two parallel reactors; passing at least a portion of the polymer-containing mixture to the second parallel reactor; mixing the polymer-containing mixture in the first and second parallel reactors with additional amounts of the same or a different vinylaromatic monomer under welt stirred, back-mixed polymerization conditions to form the syndiotactic vinylaromatic polymer.

In a third aspect, the present invention is a method for making a syndiotactic vinylaromatic polymer comprising mixing a first amount of a vinyl aromatic monomer with a catalyst in a back-mixed first reaction zone of a reactor such that the vinylaromatic monomer polymerizes to a conversion of 60 percent to 85 percent to form a polymer-containing mixture; passing the polymer-containing mixture to at least one other back-mixed reaction zone of a reactor; and contacting the polymer-containing mixture with a second amount of the vinylaromatic monomer in the other reaction zone to form the syndiotactic vinylaromatic polymer.

The present invention provides for a more efficient use of catalyst by feeding the vinylaromatic monomer to more than one reactor while at the same time back-mixing the contents within each reactor.

Figure 1:
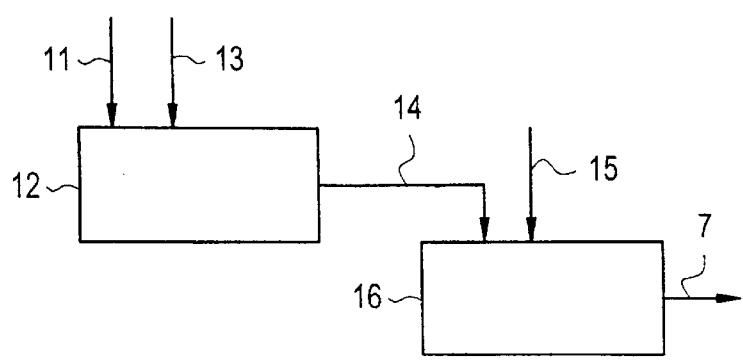
FIG. 1 is a schematic diagram of an embodiment of the method of the present invention.

FIG. 1 shows a schematic diagram of an embodiment of the method of the present invention. A first amount 11 of a vinyl aromatic monomer is fed to a first back-mixed reactor 12. A catalyst stream 13 is also fed to the first back-mixed reactor 12 such that the first amount 11 of the vinylaromatic monomer mixes with the catalyst 13 in the first reactor 12 under polymerization conditions to form a polymer-containing mixture which exits the first reactor 12 as exit stream 14.

Exit stream 14 is then fed to a second back-mixed reactor 16. A second amount 15 of vinylaromatic monomer is also fed to the second back-mixed reactor 16 where it contacts the polymer-containing mixture from the first reactor and polymerizes to form the syndiotactic vinylaromatic polymer. The syndiotactic polymer exits the second reactor 16 as finished product stream 17.

First reactor 12 and second reactor 16 are substantially back-mixed reactors, as opposed to plug flow reactors. The term "back-mix" is defined herein to mean that the feed entering the reactor quickly becomes dispersed throughout the reactor because of effective agitation inside the reactor. Thus, the composition is substantially the same at all points within the reactor. By contrast, a plug flow reactor is one in which there is mixing in the radial direction but little mixing in the flow direction (that is, no back-mixing) so that the composition varies along the flow path in the reactor. More information types of reactors and reactor design can be found in Perry & Chilton, *Chemical Engineer's Handbook*, Fifth ed., p. 4–22, McGraw-Hill (1973).

Back-mixing is desirable in the preparation of particulate syndiotactic vinylaromatic polymers because the mixing action reduces the problem of the polymer adhering to and building up on the sides of the reactor. Likewise, plug flow reactor design is undesirable because the solid build-up on the reactor walls and internal surfaces is problematic.

Because the first reactor 12 has a high degree of back-mixing, the exit stream 14 has substantially the same composition as the material inside the reactor 12. Likewise, because the second reactor 16 has a high degree of back-mixing, the finished product stream 17 has substantially the same composition as the material inside the second reactor 16.

In order to get a high degree of back-mixing, the first reactor 12 and second reactor 16 are advantageously equipped with means for agitation, such as stirring, rocking or shaking. If stirring is used, the shape of the agitator does not matter, so long as the mixing is sufficient to obtain the desired conversion rate, which is described hereinbelow.

The shape and orientation of reactor 12 and/or reactor 16 does not matter in the successful operation of the invention. Thus, the reactor can be a vertical reactor, a horizontal reactor, a tank reactor or a cylindrical reactor, or any other desired type of reactor or combinations thereof. Examples of reactors which can be used for the present invention include a self-cleaning reactor, as described in U.S. Pat. No. 5,254, 647; a vertical tank reactor, as described in U.S. Pat. No. 5,037,907; and a cylindrically shaped reactor equipped with plows, as described in U.S. Pat. No. 5,484,862.

Previously, the use of back-mixed reactors was believed to lead to low catalyst efficiency, because, in a back-mixed reactor, catalyst is dispersed throughout the reactor shortly after the catalyst is fed to the reactor, and it was believed that the catalyst did not remain in contact with the monomer molecules long enough to catalyze the polymerization. Surprisingly, the catalyst efficiency is improved in the present invention by adding monomer to more than one well-stirred, back-mixed reactor. Additional quantities of catalyst may be added to each subsequent reactor as well.

In most polymerization reactions the molar ratio of catalyst:vinylaromatic monomer is from $10^{-12}:1$ to $10^{-1}:1$, more preferably from $10^{-12}:1$ to $10^{-5}:1$. The weight ratio of the first amount of the vinylaromatic monomer to the second amount is advantageously such that the second reactor zone has optimal conversion. Preferably, if the first and second reactor zones are the same size, the weight ratio of the first amount to the second amount is from 1:0.1 to 1:0.7, more preferably from 1:0.4 to 1:0.65, and even more preferably from 1:0.5 to 1:0.6.

Preferably, the reactors used for the present invention also include means to provide sufficient shearing force to prevent agglomeration of the powder particles. Such shearing means can include, for example, a pulverizing device as described in U.S. Pat. No. 5,484,862.

Preferably, the conversion in each reaction zone is relatively high, so that there is a low amount of excess unpolymerized monomer. "Conversion" is defined herein to mean the weight percentage of monomer that is polymerized, or converted to polymer. The conversion in the first reactor zone is advantageously at least high enough to prevent buildup that is caused by polymerization of excess monomer on the internal surfaces of the reactor. The conversion in the first reactor zone is preferably greater than 60 percent, more preferably greater than 65 percent and even more preferably greater than 70 percent.

The conversion in the first reactor zone is advantageously as high as possible such that as much of the available monomer as possible is polymerized. "Available monomer" is monomer that is not trapped within the crystalline structure of the syndiotactic polymer. The conversion in the first reactor zone is preferably less than 90 percent, more preferably less than 87 percent and even more preferably less than 85 percent. Preferably, the overall conversion for the entire process, that is, counting all of the reactor zones, is from 60 percent to 85 percent, and more preferably from 70 percent to 80 percent.

Suitable vinylaromatic polymers prepared according to the present invention include homopolymers or interpolymers of vinylaromatic monomers represented by the formula: $ArCH=CH_2$, wherein Ar is phenyl or a phenyl group substituted with from 1 to 5 radicals selected from the group consisting of halo, alkyl, and haloalkyl. Exemplary vinylaromatic monomers include styrene, vinyltoluene, t-butyl styrene, chlorostyrene and bromostyrene. Preferred syndiotactic vinylaromatic polymers include syndiotactic polystyrene and syndiotactic copolymers of styrene and p-vinyltoluene containing up to 25 percent vinyltoluene by weight. The terms "syndiotactic" and "syndiotacticity" are defined herein to mean the stereostructure in which phenyl groups as side chains are located alternately at opposite directions relative to the main chain, which consists of carbon-carbon bonds. Tacticity may be determined by known techniques of 13C NMR analyses. Preferred syndiotactic polymers have greater than 75 percent, more preferably greater than 90 percent syndiotactic triads.

Suitable catalysts employed in the present polymerization process include any substance previously known to be active in the polymerization of vinylaromatic monomers to form polymers of high syndiotacticity. Generally such catalyst systems comprise a Group 4 metal complex and one or more activating cocatalysts. Preferably, the catalyst is a titanium-containing compound. More information the chemistry and the reaction occurring in syndiotactic vinylaromatic polymers is described in U.S. Pat. No. 5,484,862, issued to Siddall et al.; U.S. Pat. No. 5,037,907, issued to Imabayashie et al.; and U.S. Pat. No. 5,254,647, issued to Yamamoto et al.

Additional reaction components such as other catalysts, catalyst activators, diluents, chain transfer agents and inerting agents may be introduced to any of the reactors, either together with the monomer and/or catalyst feed stream or through a separate line.

Preferably, because the polymerization is exothermic, the reactors used for the present invention include heat transfer means for cooling, such as, for example, a jacket, external and/or internal heat exchangers. More preferably, heat transfer can be accomplished by spraying a diluent directly into the polymer product. In this manner, the reaction can be cooled through the latent heat of vaporization of such diluent. Especially suitable diluents are low boiling aliphatic compounds such as butane, pentane, isopentane and hexane. The low-boiling diluent can then be flashed off and recycled back through the process. Spraying a diluent directly into the particulate solid polymer product causes ebullient cooling and gas formation.

The process can be run continuously or as a batch process. Preferably, the process is run continuously in order to reduce the operating cost and facilitate control of product quality. When run continuously at steady state, the surface level of the particulate solid inside the reactor is maintained by continuous removal of product and continuous addition of reactants. Remaining volume of the reactor not filled with polymer or liquid monomer is filled with vaporized monomer, diluent, chain transfer agents and/or inerting agents.

When run as a batch process, one reactor may be used. In this manner, the second amount of the vinylaromatic monomer may be added to the reactor after the first amount of the vinylaromatic monomer has polymerized to the desired conversion.

The term "polymerization conditions" is defined herein to mean conditions sufficient to promote the polymerization of the vinylaromatic monomer. Polymerization conditions include temperatures which are preferably from 25–85 degrees centigrade and pressures which are preferably from atmospheric to 10,000 atmospheres.

Gaseous, inert diluents may be present in any or all of the reactors to assist in preventing oxygen entry into the reactor. Preferably, a positive pressure from 0.1 to 100 psi (0.7 to 700 kPa) above ambient is desirable inside the reactor to retain the reaction mixture under inert reaction conditions.

Figure 2:
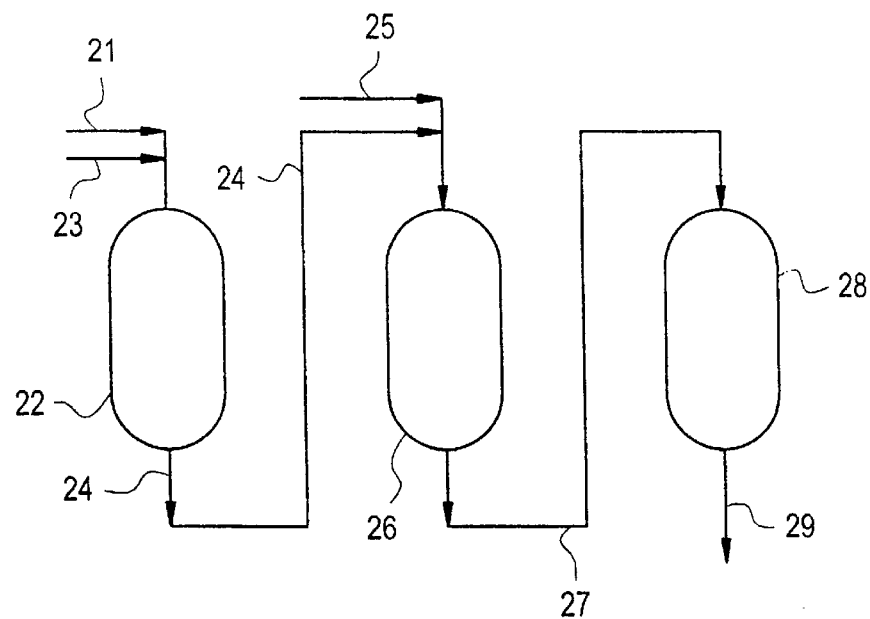
FIG. 2 is a schematic diagram of an alternative embodiment of the present invention.

Referring now to FIG. 2, therein is shown an alternate embodiment of the present invention. FIG. 2 shows three reactors in series. A feed stream 21 containing a first amount of a vinyl aromatic monomer is fed to a first back-mixed reactor 22. A catalyst stream 23 is also fed to the first back-mixed reactor 22 such that the first amount of the vinylaromatic monomer mixes with the catalyst in the first reactor 22 to polymerize and form a polymer-containing mixture which exits the first reactor 22 as first exit stream 24.

Exit stream 24 is then fed to a second back-mixed reactor 26. A second feed stream 25 containing a second amount of vinylaromatic monomer is also fed to the second back-mixed reactor 26 where it is mixed with the product from the first reactor 22 and polymerizes to form a second polymer-containing mixture which exits the second reactor 26 as second exit stream 27. If desired, catalyst can be added to the second reactor 26.

The second exit stream 27 is then fed to the third reactor 28. If desired, monomer and/or catalyst can be fed to the third reactor 28 where it can contact the second exit stream and polymerize to form the syndiotactic vinylaromatic polymer. The syndiotactic vinylaromatic polymer exits the third reactor 28 as finished product stream 29. Preferably, the third reactor 28 is back-mixed.

In the embodiment of FIG. 2, first reactor 22, second reactor 26 and third reactor 28 are all vertical reactors. However, if desired, any combination of vertical or horizontal reactors can be used. The chemistry and conversion rates are as described above.

Figure 3:
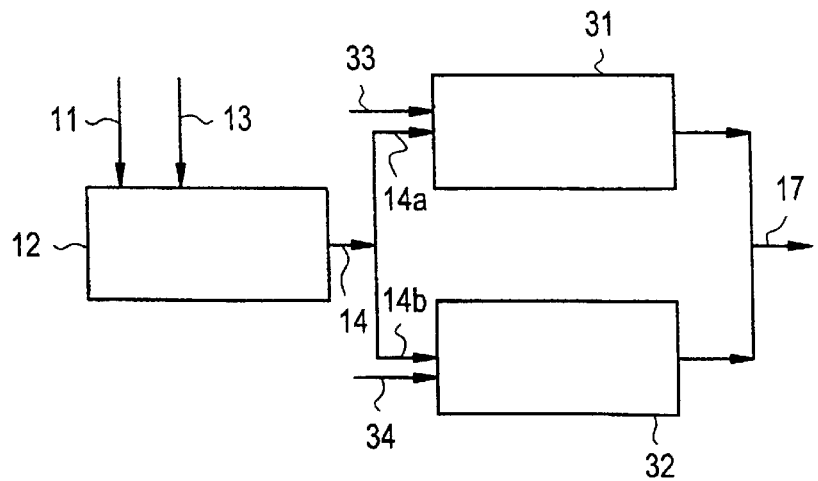
FIG. 3 is a schematic diagram of another alternative embodiment of the present invention.

Referring now to FIG. 3, therein is shown another embodiment of the present invention. As with the previous embodiments, a first amount 11 of a vinylaromatic monomer is mixed with a catalyst 13 in a first back-mixed reactor 12 wherein the monomer polymerizes to form a polymer-containing mixture. The polymer-containing mixture exits the first reactor 12 as exit stream 14.

A portion 14a of the exit stream 14 is then fed to a first parallel back-mixed reactor 31. A portion 14b of the exit stream 14 is also fed to a second parallel back-mixed reactor 32. A second amount 33 of the vinylaromatic monomer is fed to the first parallel reactor 31, and a third amount 34 of the vinylaromatic monomer is fed to the second parallel reactor 32. The ratio of portion 14a to portion 14b is advantageously approximately the same as the ratio of the second amount 33 to the third amount 34.

Reactors 31 and 32 are parallel reactors as opposed to reactors in series. The advantage of using reactors in parallel is that, as reactor volume capacity is reached due to physical, mechanical or cost limitations, the volume of the overall process can be expanded by adding additional reactors.

As described above, reactors 31 and 32 are highly back-mixed reactors and preferably include means for shearing. Moreover, reactors 31 and 32 preferably include means for cooling the polymer as it is formed. The chemistry and conversion rates are as described above.

EXAMPLES

In each of the examples, two 4.6 ft$^3$ (0.130 M$^3$) cylindrical horizontal reactors equipped with agitators, each agitator comprising an axially disposed shaft supporting four evenly spaced, dynamically balanced, radially projecting steel arms terminating in steel plows (Littleford model DVT-130), were filled with inert SPS to provide the substrate to begin polymerization. The agitator speeds were 100 rpm.

Both reactors were heated to 70 degrees centigrade for 2 hours with a nitrogen purge to remove any volatile contaminants. Both reactors were given 500 g of a 7 millimolar catalyst solution to neutralize any other non-volatile impurities in the substrate. Octahydrofluorenyltitanium trimethoxide ([656]Ti(Ome)) was the catalyst.

Monomer and catalyst were added to the top of the mixing vessel in a continuous fashion and powdered polymer and unreacted monomers exited the reactor through an overflow weir on the front of the reactor. The monomer was freed from water and other polar compounds to less than 1 ppm. The system was allowed to reach steady state.

The monomer feed rate to the first and second stages were then measured in kilograms per hour. The catalyst feed rate was also measured, the catalyst ratio being the moles of catalyst to the moles of monomer added to the process. The conversion in each of the first and second stages were also measured. The values are listed below in Table I. For the Comparative Example, monomer and catalyst were both added to both reactors. For Examples 1 and 2, monomer was added to both reactors, but catalyst was added only to the first reactor. Table I shows that, for Examples 1 and 2, the catalyst usage was reduced by 33 percent as compared to the Comparative Example.

TABLE I

| Example | 1$^{st}$ stage Monomer (kg/hr) | 2$^{nd}$ stage Monomer (kg/hr) | Catalyst Ratio | 1$^{st}$ stage Conversion (percent) | 2$^{nd}$ stage Conversion (percent) |
|---|---|---|---|---|---|
| Comparative | 12.5 | 12.5 | 8.0 × 10$^6$ | 79 | 80 |
| 1 | 12.5 | 6.25 | 5.3 × 10$^6$ | 79 | 80 |
| 2 | 20 | 10 | 5.3 × 10$^6$ | 80 | 77 |

What is claimed is:

1. A method for making a syndiotactic vinylaromatic polymer comprising:
    mixing a first amount of a vinylaromatic monomer with a catalyst and back-mixing the mixture under polymerization conditions such that the first amount of the vinylaromatic monomer polymerizes to a conversion of from greater than 60 to less than 90% to form a polymer-containing mixture; and
    contacting the polymer-containing mixture with a second amount of the vinylaromatic monomer and back-mixing the second amount and the polymer-containing mixture under polymerization conditions such that the syndiotactic vinylaromatic polymer is formed,
    wherein the catalyst is added only to the first amount of vinylaromatic monomer.

2. The method of claim 1 wherein the syndiotactic vinylaromatic polymer is syndiotactic polystyrene.

3. The method of claim 2 wherein the catalyst is a titanium-containing compound.

4. The method of claim 1 further comprising the step of shearing the polymer-containing mixture as it is formed.

5. The method of claim 1 further comprising the step of shearing the syndiotactic vinylaromatic polymer as it is formed.

6. The method of claim 1 wherein the second amount of the vinylaromatic monomer and the polymer-containing mixture polymerize at a conversion rate of from 60 to 85 percent.

7. The method of claim 1 wherein the ratio of the first amount of the vinylaromatic monomer to the second amount is 2:1.

8. A method for making a syndiotactic vinylaromatic polymer comprising:
    mixing a first amount of a vinylaromatic monomer with a catalyst in a first reaction zone under polymerization conditions;
    back-mixing the mixture in the first reaction zone such that the first amount of the vinylaromatic monomer polymerizes to a conversion of from 60 percent to 85 percent to form a polymer-containing mixture;

passing at least a portion of the polymer-containing mixture to a first parallel reactor;

passing at least a portion of the polymer-containing mixture to a second parallel reactor;

mixing the polymer-containing mixture in the first parallel reactor with a second amount of the vinylaromatic monomer under polymerization conditions;

mixing the polymer-containing mixture in the second parallel reactor with a third amount of the vinylaromatic monomer under polymerization conditions; and back-mixing each of the parallel reactors to form the syndiotactic vinylaromatic polymer.

9. The method of claim 8 wherein the syndiotactic vinylaromatic polymer is syndiotactic polystyrene.

10. The method of claim 8 wherein the catalyst is a titanium-containing compound.

11. The method of claim 8 further comprising the steps of:

shearing the polymer-containing mixture as it is formed in the first reaction zone.

12. The method of claim 11 further comprising the steps of:

shearing the syndiotactic vinylaromatic polymer as it is formed in the first parallel reactor; and shearing the syndiotactic vinylaromatic polymer as it is formed in the second parallel reactor.

13. The method of claim 8 wherein the polymer-containing mixture and the second amount of the vinylaromatic monomer polymerize in the first parallel reactor to a conversion of from 60 to 85 percent.

14. The method of claim 8 wherein the polymer-containing mixture and the third amount of the vinylaromatic monomer polymerize in the second parallel reactor to a conversion of from 60 to 85 percent.

15. The method of claim 8 wherein the ratio of the first amount of the vinylaromatic monomer to the second amount is 2:1 and the ratio of the first amount of the vinylaromatic monomer to the third amount is 2:1.

16. A method of making a syndiotactic vinylaromatic polymer comprising:

mixing a first amount of a vinyl aromatic monomer with a catalyst in a back-mixed first reaction zone such that the vinylaromatic monomer polymerizes to a conversion of 60 percent to 85 percent to form a polymer-containing mixture;

passing the polymer-containing mixture to at least one other back-mixed reaction zone;

contacting the polymer-containing mixture with a second amount of the vinylaromatic monomer in the other reaction zone to form the syndiotactic vinylaromatic polymer.

17. The method of claim 16 wherein the syndiotactic vinylaromatic polymer is syndiotactic polystyrene.

18. The method of claim 16 wherein the catalyst is a titanium-containing compound.

19. The method of claim 16 further comprising the steps of:

shearing the polymer-containing mixture as it is formed in the first reaction zone; and shearing the syndiotactic vinylaromatic polymer as it is formed in the second reaction zone.

20. The method of claim 16 wherein the ratio of the first amount of the vinylaromatic monomer to the second amount is 2:1.

* * * * *